United States Patent [19]
Van Heelsbergen

[11] 3,836,831
[45] Sept. 17, 1974

[54] PLURAL MOTOR TENSION CONTROLLED TAPE DRIVE

[75] Inventor: Teunis Robert Van Heelsbergen, Emmasingel, Eindhoven, Netherlands

[73] Assignee: U.S. Philips Corporation, New York, N.Y.

[22] Filed: Sept. 11, 1972

[21] Appl. No.: 288,109

[30] Foreign Application Priority Data

Sept. 25, 1971 Netherlands ....................... 7113225

[52] U.S. Cl. .................................. 318/7, 242/75.44
[51] Int. Cl. ............................................ B65h 59/38
[58] Field of Search .................. 318/7, 6; 242/75.44

[56] References Cited

UNITED STATES PATENTS

| | | | |
|---|---|---|---|
| 3,117,262 | 1/1964 | Mullin | 318/7 |
| 3,218,529 | 11/1965 | Evans et al. | 318/7 |
| 3,501,682 | 3/1970 | Jacoby | 318/7 |
| 3,512,733 | 5/1970 | Ault | 318/7 X |

*Primary Examiner*—T. E. Lynch
*Attorney, Agent, or Firm*—Frank R. Trifari; Bernard Franzblau

[57] ABSTRACT

Arrangement intended in particular for driving a tape-shaped record carrier accommodated in a cassette, which arrangement is provided with two direct-current motors which each drive one reel. In the "fast forward" and "fast rewind" functions one end of each of the two motor windings is connected via a common impedance to one terminal of the supply source, the other end of the winding of the take-up motor being directly connected to the other terminal, whilst the other end of the winding of the take-off motor is connected to this other terminal of the supply source via a Zener diode. As a result the brake torque exerted by the take-off motor always is automatically regulated to a value such that the sum of the speeds of the two motors is constant. Consequently the tape tension produced is substantially independent of the friction produced. Also the time required for the "wind" functions is substantially constant.

18 Claims, 4 Drawing Figures

PLURAL MOTOR TENSION CONTROLLED TAPE DRIVE

Figure 1:
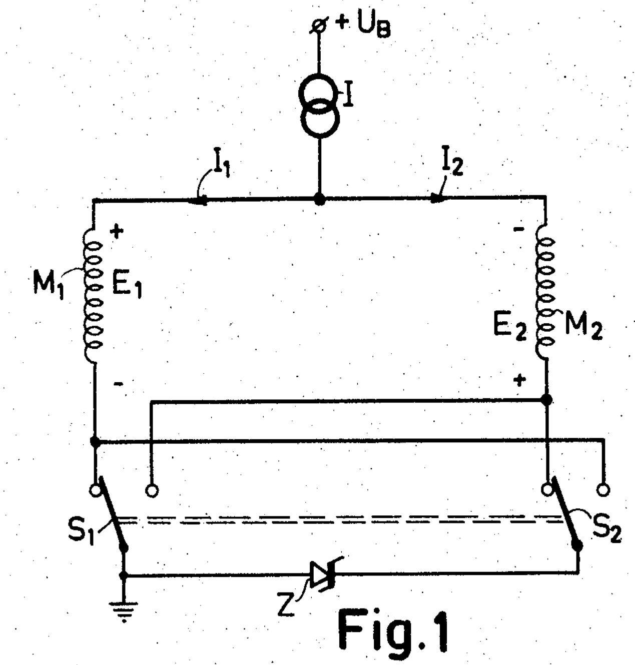

The invention relates to an arrangement for driving a tape-shaped record carrier (tape), which arrangement is provided with two direct-current motors which each serve to drive a reel and with a circuit for controlling these motors for rapid and simultaneous unwinding of the record carrier from one reel and winding it on to the other reel or vice versa (fast forward and rewind), the torque delivered by the motor of the take-up reel being opposed to the torque delivered by the motor of the supply or take-off reel.

The invention relates in particular to an arrangement for driving tape-shaped record carriers accommodated in cassettes. Practice has shown that the friction which occurs in such cassettes may vary appreciably, not only between different cassettes but also in one and the same cassette. This friction is due on the one hand to the movement of the record carrier past guide elements, such as guide rollers and guide pins, and on the other hand by the mounting of the two reels in the cassette casing. It will be clear that even in cassettes of the same make and type the value of this friction may differ from cassette to cassette owing to manufacturing tolerances, and that in cassettes of different types or makes these differences may be appreciably larger. Moreover, during the life of a cassette the value of this friction will vary owing to wear. Another and highly variable friction effect in cassettes is caused by the absence of flanges in both reels. Consequently, the record carrier is not laterally guided by the reels. Owing to lateral deviations which occur when the record carrier is being wound the latter will engage the cassette case, giving rise to a friction component which depends upon the winding condition of the record carrier and hence is highly variable. The record carrier may even jam owing to poor winding so that movement is stopped and the record carrier is liable to be damaged.

Irregular winding of the record carrier occurs primarily during the fast forward and rewind functions. For example, in a known arrangement, during these functions the motor of the take-up reel is fed with a constant voltage so that this reel takes up the record carrier at a constant speed and hence the winding time is constant, whilst the motor of the supply reel is fed with a constant current so that this motor delivers a constant brake torque. In this winding method, however, the torque delivered by the motor for the take-up reel increases so that the tape tension, i.e., the tensile force exerted on the record carrier, increases during winding. This entails undesirably taut winding of the last part of the record carrier on the take-up reel, which may cause it to become stuck. Furthermore the absolute value of the instantaneous tape tension depends upon the friction produced in the cassette so that for a low-friction cassette this tape tension will be too low, and for a high-friction cassette this tape tension will be too high to obtain regular satisfactory winding of the record carrier.

It is an object of the invention to provide an arrangement of the type described at the beginning of this specification which enables the aforementioned difficulties to be simply avoided. The invention is characterized in that during the fast forward and rewind functions one end of each of the two motor windings is connected to one of the terminals of a supply source via a common impedance, while the other end of the winding of the take-up motor is directly connected to the other terminal of the supply source and the other end of the winding of the take-off motor is connected to this other terminal of the supply source via a voltage-dependent element the impedance of which, at least above a given voltage, decreases with increasing voltage.

The arrangement according to the invention ensures that the tape tension produced is substantially independent of the value of the friction since the brake torque delivered by the motor of the take-off reel is automatically matched to the instantaneous friction. As a result, the value and variation of the tape tension chosen in the design of the arrangement will be maintained with a good approximation irrespective of variations of the friction due to the use of different cassettes or to wear. Thus, irrespective of the instantaneous friction, the record carrier will always be wound on the take-up reel in a desired manner associated with the chosen tape tension.

Moreover, the arrangement according to the invention maintains a constant winding time because the sum of the speeds of the take-up and take-off motors is substantially constant. Since with given diameters of the empty reels and given length and thickness of the tape the ratio between these speeds is uniquely determined at any instant during winding, this means that the two speeds are uniquely determined at any instant during winding, irrespective of the instantaneous friction, so that the winding time also is uniquely determined.

The voltage-dependent element used may be a voltage-dependent resistor (VDR). In a preferred embodiment of the arrangement according to the invention a Zener diode is used as the voltage-dependent element. The use of a Zener diode has the advantage that owing to the marked bend in the current-voltage characteristic the sum of the speeds of the take-up and take-off reels, and hence the tape tension, are exactly determined.

The common impedance via which one end of each of the two motor windings is connected to one of the terminals of the supply source may take the form of a current source. When using such a current source it is found that the current flowing through the winding of the take-up motor may be assumed to be approximately constant. This means that the torque exerted by this motor may also be assumed to be constant during the winding operation, which means that the tape tension decreases steadily during the winding function because the tape tension varies inversely with the diameter of the take-up reel.

Although in this manner satisfactory winding of the record carrier onto the take-up reel is obtained, it is of greater advantage for the tape tension to decrease to a lesser degree during winding. In a further preferred embodiment of the arrangement according to the invention, this may be achieved by using a resistor as the common impedance. This ensures that during winding the current flowing through the take-up motor, and hence the torque delivered by this motor; increase steadily, which has the effect of increasing the tape tension so that the progressive decrease of the tape tension due to the increase of the diameter of the take-up reel may be compensated in a manner such as to provide a desired variation of the tape tension during winding.

To enable the control circuit to be of simple design it is desirable that the voltage-dependent element have a symmetrical behaviour. When a voltage-dependent resistor is used this may readily be achieved by employing a resistor having a symmetrical characteristic. However, a Zener diode has an asymmetrical characteristic. In order to enable a simple control circuit to be used in spite of the use of a Zener diode as the voltage-dependent element, in a further preferred embodiment of the arrangement according to the invention, an additional Zener diode is connected in series opposition to the aforementioned Zener diode. This preferred embodiment has the additional advantage that further provisions may simply be made for transporting the record carrier at playback speed and for rapidly braking it to a standstill and the like.

Figure 2:
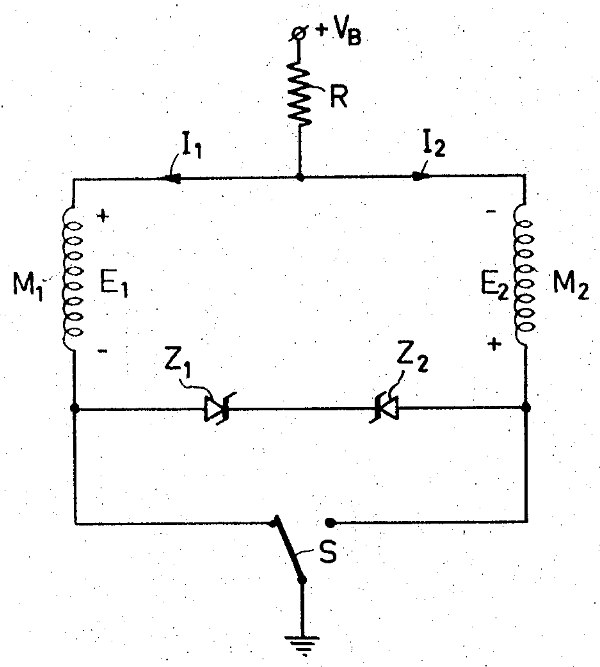
Figure 3:
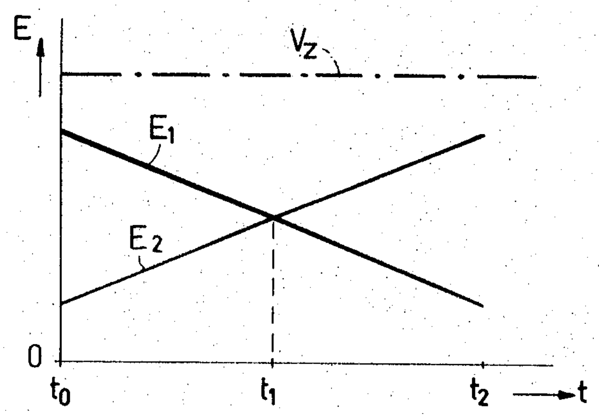
Figure 4:
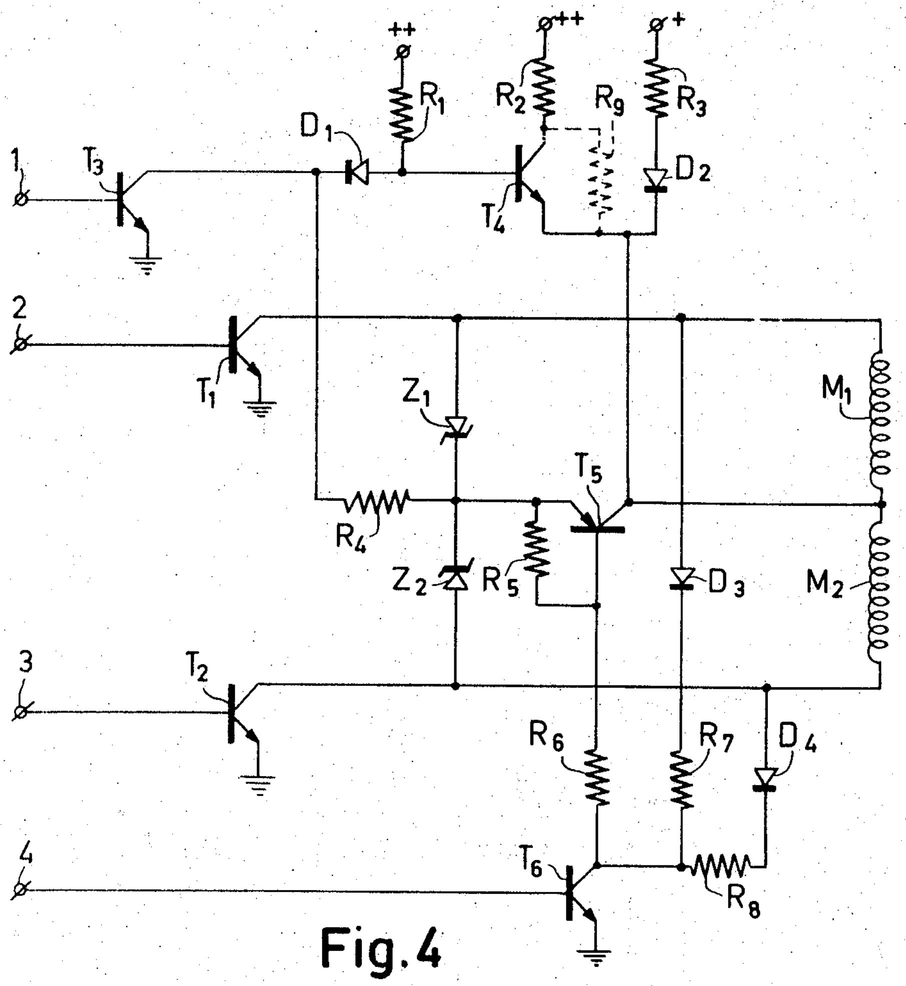

Embodiments of the invention will now be described, by way of example, with reference to the accompanying diagrammatic drawings in which:

FIGS. 1 and 2 show first and second embodiments of the invention,

FIG. 3 graphically shows the voltages $E_1$ and $E_2$ as a function of time (reel speed), and FIG. 4 shows with additional details a third embodiment of the invention.

Referring now to FIG. 1, the windings of two identical direct-current motors $M_1$ and $M_2$ are shown, which motors may each be coupled to a reel of a cassette. It is assumed that the record carrier is to be wound from the reel coupled to the motor $M_2$ on to the reel coupled to the motor $M_1$. During the winding operation both motor windings have one end connected, via a common current source I, to the positive terminal $+V_B$ of the supply source. It should be noted that the switches for switching the arrangement to the various functions, such as play, reverse play, fast forward and rewind, are not shown because they are not essential to an understanding of the invention. The other end of the winding of the motor $M_1$ is connected via a switch $S_1$ to the negative terminal of the supply source (for example, ground), the other end of the winding of the motor $M_2$ being connected to the negative terminal of the supply source via the series combination of a switch $S_2$ and a Zener diode Z. When the two mechanically coupled switches $S_1$ and $S_2$ are changed over, the two motor windings are interchanged so that the winding of the motor $M_2$ is directly connected to the negative terminal of the supply source and the winding of the motor $M_1$ is connected thereto via the Zener diode Z causing the tape to be wound in the reverse direction, i.e., from the reel coupled to the motor $M_1$ on to the reel coupled to the motor $M_2$.

Assuming the switches $S_1$ and $S_2$ to be in the positions shown at the beginning of the winding operation, the current from the current source I will be entirely absorbed by the winding of the motor $M_1$, so that $I_1 = I$, because no voltages are set up across the windings of the motors $M_1$ and $M_2$, since these motors are still stationary, and hence the Zener diode Z is cut off, so that $I_2 = 0$. Owing to the current $I_1 = I$ which flows through the winding of the motor $M_1$ this motor will rapidly start and its speed and hence the speed of the motor $M_2$ will rapidly increase. As a result, voltages $E_1$ and $E_2$ are induced across the windings of the motors $M_1$ and $M_2$, respectively, which voltages are proportional to the speeds of the motors and rapidly increase. Neglecting the internal impedances of the motor windings, the induced voltages $E_1$ and $E_2$ also represent the total voltages across the motor windings. Because the take-off motor is driven against its direction of rotation, the sum of the voltages $E_1$ and $E_2$ is set up across the Zener diode Z. If the speeds of the two motors reach values such that the sum voltage $E_1 + E_2$ equals the breakdown voltage of the Zener diode Z, this diode will become conductive and a finite current $I_2$ will flow through the winding of the motor $M_2$. As a result the motor $M_2$ exerts a brake torque which counteracts any further increase of the speeds, for such further increase of the two speeds would involve an increase of the sum voltage $E_1 + E_2$, so that $I_2$ and hence the brake torque would increase. Because above the breakdown voltage of the Zener diode the current increases greatly with the voltage, a condition will be reached and maintained at which the sum voltage $E_1 + E_2$ is substantially equal to the Zener voltage and consequently the sum of the speeds of the two motors is equal to a value corresponding to this sum voltage.

Thus it is simply ensured that the sum of the speeds of the take-up and take-off reels always is constant irrespective of the instantaneous friction. Because the ratio between the speeds of the two reels is completely determined at any instant during winding, this means that the speed of each of the reels is completely determined at any instant irrespective of the instantaneous friction. FIG. 3 is a diagram which shows, by way of example, the variations of the voltages $E_1$ and $E_2$ associated with the variations of the speeds as a function of time. It is assumed that at an instant $t_0$ the take-up reel is empty and the entire tape is on the take-off reel. Assuming the diameter of a full reel to be, say, four times the diameter of an empty reel, at the instant $t_0$ the speed of the take-up reel will be four times the speed of the take-off reel, and hence $E_1 = 4 E_2$. Assuming the winding operation to be terminated at the instant $t_2$, i.e., at this instant the take-up reel is full and the take-off reel is empty, the ratio between the speeds of the two reels is just the reverse, i.e., $E_2 = 4E_1$. Furthermore, at an instant $t_1$ at which the diameters of the two reels are equal, the two speeds are equal and hence $E_1 = E_2$. According to the invention it is ensured that the sum voltage $E_1 + E_2$ always is constant and equal to the Zener voltage $V_Z$, resulting in the variations shown in FIG. 3 of the voltages $E_1$ and $E_2$. It should be noted that the linear variations of the voltages $E_1$ and $E_2$ shown in the diagram are idealized. In actual fact these variations are slightly irregular, but this irregularity is not essential and does not impair satisfactory operation of the arrangement. An essential feature is that the step according to the invention ensures that at any instant during winding the absolute value of the voltages $E_1$ and $E_2$ and hence the absolute value of the speeds is fixed, irrespective of the instantaneous friction. The actual waveforms of the voltages $E_1$ and $E_2$ are not of importance in this connection since these waveforms are constant data.

Although from the above it already follows that the winding time is constant irrespective of the instantaneous friction, a far more important fact will be apparent from a consideration of the tape tension produced.

When using a current source I as a common impedance it is found that the torque exerted by the take-up motor may be regared as substantially constant during a winding operation, for the current $I_2$ flowing through the winding of the take-off motor $M_2$ proves to be considerably smaller than the current $I_1$ flowing through the winding of the take-up motor $M_1$. This is due to the fact that owing to the guiding of the record carrier between the take-off and take-up reels via guide rollers, guide pins and the like a torque exerted at the take-up end can be compensated for by a considerably weaker torque. Consequently, variations in the current $I_2$ flowing through the winding of the take-off motor $M_2$ cause only small relative variations in the current $I_1$ flowing through the winding of the take-up motor $M_1$. Therefore, the current $I_1$ and hence the torque developed by the take-up motor may be assumed to be approximately constant.

As is apparent from the above, the brake torque exerted by the take-off motor always is automatically adjusted to a value such that the sum of the speeds of the two reels always is constant. This means, however, that in the case of variations of the friction produced the torque exerted by the take-off motor must be inversely varied to maintain the sum of the speeds at a constant value. This implies, however, that at any instant during winding the total brake force exerted on the record carrier, which force is composed of a component produced by the brake torque of the take-off motor and a component produced by the friction, has a value which is independent of the value of the friction. Since at any instant during winding the torque exerted by the take-up motor also has a value which is independent of this friction, this means that at any instant during winding the value of the tape tension is independent of the instantaneous friction.

This tape tension is not constant but decreases during winding, for with a constant torque exerted by the take-up motor the tensile force exerted on the record carrier, and hence the tape tension, decrease with increase in the reel diameter. As has been shown hereinbefore, however, the variation and the absolute value of the tape tension is independent of the instantaneous friction and hence independent of the cassette used and of wear effects. This ensures that the manner of winding the record carrier on to the take-up reel always is identical and hence a chosen advantageous winding manner is always maintained irrespective of the cassette used and of wear effects.

The voltage-dependent element may be a voltage-dependent resistor (VDR) instead of a Zener diode. However, the use of a Zener diode has the advantage that owing to the sharp bend in the current-voltage characteristic the sum voltage $E_1 + E_2$ is accurately defined and hence the sum of the speeds of the two reels is exactly fixed.

The Zener diode may alternatively be replaced by a transistor the base emitter path and the base collector path of which are shunted by a resistor.

FIG. 2 shows a second embodiment of the arrangement according to the invention which, when compared to the embodiment shown in FIG. 1, has the advantage that the switching arrangement may be simpler. A first difference from the arrangement shown in FIG. 1 is that in the embodiment shown in FIG. 2 the voltage-dependent element comprises the series-opposition combination of two Zener diodes $Z_1$ and $Z_2$ which is directly connected to the ends of the windings of the motors $M_1$ and $M_2$. To reverse the winding direction only a single swtich S need be used which in one position connects the end of the winding of the motor $M_1$ to ground and in the other position connects the end of the winding of the motor $M_2$ to ground. In the position shown of the switch S the motor $M_1$ acts as the take-up motor. Regulation will be such that the sum voltage $E_1 + E_2$ is equal to the Zener voltage of the Zener diode $Z_1$, because in this event the Zener diode $Z_2$ is connected in the forward direction. In the second position of the switch S, with the motor $M_2$ acting as the take-up motor, the Zener voltage of the Zener diode $Z_2$ determines the sum voltage $E_1 + E_2$ and the Zener diode $Z_1$ is connected in the forward direction.

A second difference from the embodiment shown in FIG. 1 consists in the provision of a resistor R which, instead of the voltage source I, serves as a common impedance for the two windings of the motors $M_1$ and $M_2$. The use of this resistor R permits even better winding of the record carrier on to the take-up reel than was the case with the use of the current source I (see FIG. 1).

As has been stated hereinbefore, when using a current source as a common impedance, the tape tension decreases with increasing reel diameter of the take-up reel. As a result the last part of the record carrier may be wound too loosely. A better approach to ideal winding is obtained by ensuring that the tape tension decreases very little during winding.

The latter effect is obtainable by using the resistor R as a common impedance instead of the current source I, for during winding the voltage $E_1$ induced across the winding of the take-up motor steadily decreases (see FIG. 3). As a result the voltage across the resistor R increases so that the current flowing through this resistor and hence the current $I_1$ flowing through the winding of the take-up motor $M_1$ will steadily increase. Hence the torque exerted by the take-up motor will steadily increase during winding. A suitable choice of the values of the resistor and of the supply voltage $V_B$ relative to the voltage induced across the winding of the take-up motor permits of ensuring that the tendency of the tape tension to decrease owing to an increase of the reel diameter is compensated by the increase of the torque exerted by the take-up motor in a manner such that a tape tension is obtained which decreases very slowly during winding, with consequent satisfactory winding of the record carrier.

FIG. 4 shows a third embodiment of the arrangement according to the invention which largely corresponds to that shown in FIG. 2, but in which the switches are electronic switches. The switches for switching the arrangement to the various functions, such as forward play, reverse play and fast forward and rewind, are also shown.

The arrangement again includes the two windings of the motors $M_1$ and $M_2$. These motors are again shunted by the series opposition combination of two Zener diodes $Z_1$ and $Z_2$. A first electronic switch is formed by a transistor $T_1$ to the base of which a control signal is applied via a terminal 2. A second electronic switch takes the form of a transistor $T_2$ to the base of which a control signal is applied via a terminal 3. The positions of these two electronic switches determine the direction of rotation, i.e., the direction of movement of the record carriers, both in "play" and in "wind" (fast forward and rewind).

The arrangement includes a third electronic switch which comprises a transistor $T_3$ in conjunction with a diode $D_1$, a resistor $R_1$ and a transistor $T_4$, a control signal being applied to this switch via the terminal 1. This third switch ensures the change-over from "play" to "wind" and vice versa.

The arrangement further includes a fourth electronic switch which comprises a transistor $T_6$ to which a control signal is applied via a terminal 4. This fourth electronic switch serves to bring the arrangement to the stop condition.

The junction point of the two windings of the motors $M_1$ and $M_2$ on the one hand is directly connected to the emitter of the transistor $T_4$ and on the other hand is connected, via the collector emitter path of a *pnp* transistor $T_5$, the base of which is connected via a resistor $R_6$ to the collector of the transistor $T_6$, to the junction point of the two Zener diodes.

The arrangement employs two supply voltages (indicated by + and ++ in the Figure), the supply voltage indicated by + being, for example, 8 volts and that indicated by ++ being, for example, 24 volts.

Both in "play" and in "wind" the control voltage at the terminal 4 is low so that the transistor $T_6$ is cut off and consequently the transistor $T_5$ also is cut off, breaking the connection between the junction point of the two Zener diodes and the junction point of the two motor windings.

For the "wind" functions the control voltage applied to the terminal 1 is low so that the transistor $T_3$ is cut off and its collector voltage is high. As a result the diode $D_1$ is cut off so that the base voltage of the transistor $T_4$ is high and consequently this transistor is conductive. Under these circumstances a current is supplied to the junction point of the two motor windings via a resistor $R_2$, which corresponds to the resistor R of FIG. 2. The winding direction is determined by the control signals at the terminals 2 and 3. If the voltage at the terminal 2 is high and that at the terminal 3 is low, the transistor $T_1$ is conducting and the transistor $T_2$ is cut off. The winding of the motor $M_1$ then is connected to ground via the transistor $T_1$, while the winding of the motor $M_2$ is connected to ground via the series opposition combination of the Zener diodes and the said transistor $T_1$, resulting in a situation which corresponds to that shown in FIG. 2 in which the motor $M_1$ acts as a take-up motor and the motor $M_2$ as a take-off motor. When the control voltages are interchanged, i.e., the voltage at the terminal 2 is low and that at the terminal 3 is high, the situation will be exactly opposite, the motor $M_2$ acting as the take-up motor and the motor $M_1$ as the take-off motor.

To rapidly terminate the wind and play functions, i.e., at "stop," the voltage at the terminal 4 is made high and that at the other terminals 1, 2 and 3 is made low. Thus the transistor $T_6$ and hence the transistor $T_5$ will conduct. As a result, the winding of the take-off motor is short-circuited via the Zener diode, which for this motor winding is connected in the forward direction, and the transistor $T_5$, so that this motor develops a large brake torque and movement is rapidly stopped. Thus, the Zener diode also acts as a freewheeling diode for this motor winding.

To ensure that at standstill the record carrier remains taut it is desirable that both motors should continue to deliver small opposed torques. This is ensured by means of a diode $D_3$ and a resistor $R_7$ which establish a connection between the winding of the motor $M_1$ and the collector of the transistor $T_6$ and by means of a diode $D_4$ and a resistor $R_8$ which establish a connection between the winding of the motor $M_2$ and the collector of the transistor $T_6$. At standstill the collector of the transistor $T_6$ is approximately at ground potential permitting a current to flow through both motor windings so that the two motors produce opposed torques.

In "play" the voltage at the terminal 1 is high with the result that the transistor $T_4$ is cut off. Consequently no motor current can be supplied via the resistor $R_2$. The current required for the take-up motor now is supplied via the series combination of the resistor $R_3$ and the diode $D_2$, which series combination at one end is connected to the lower (+) of the two supply voltages and at the other end to the junction point of the two motor windings. The choice between "forward play" and "reverse play" is again made by means of the control voltages at the terminals 2 and 3 which cause the supplied current to be absorbed either by the winding of the motor $M_1$ or by the winding of the motor $M_2$. In this configuration it is desirable that the winding of the take-up motor also carries a small current to produce a small brake torque in order to ensure that the record carrier remains taut. This is achieved by including a resistor $R_4$ between the junction point of the Zener diodes $Z_1$ and $Z_2$ and the collector of the transistor $T_3$. Because in "play" the collector voltage of the transistor $T_3$ is substantially 0 volts, a current will flow via the winding of the take-off motor, the Zener diode which then is connected in the forward direction and the resistor $R_4$, the value of this current being determined by the voltage across the winding of the take-up motor and the value of the resistor $R_4$. The series opposition combination of the Zener diodes plays no further part in "play" because for this function the speeds of the two motors are so low that the sum of the voltages across their windings is appreciably smaller than the Zener voltage.

The supply of current in "play" via the resistor $R_3$ and the diode $D_2$ in the circuit arrangement shown also is useful in "wind." As has been set forth with reference to FIG. 2, during fast forward or rewind the voltage across the winding of the take-up motor steadily decreases.

This means that the voltage at the emitter of the transistor $T_4$ also steadily decreases. When this voltage has decreased to a value such that the diode $D_2$ becomes conductive (this diode normally is cut off owing to the supply voltage applied to the resistor $R_2$ being higher than that applied to the resistor $R_3$), an additional current is suddenly supplied to the winding of the take-up motor and the torque produced by this motor increases. A proper choice of the relevant values permits of ensuring that with cassettes of particularly high friction this effect is produced during the final stage of the wind function, i.e., when the take-up reel is almost full and a large torque is desired to enable the desired winding speed to be maintained.

As an alternative, current supply in "wind" may be effected via a resistor $R_9$ (shown in broken lines) which shunts the collector emitter path of the transistor $T_4$, in which case the diode $D_2$ and the resistor $R_3$ may be dispensed with. This provides the advantage that only one supply voltage is required. A consequent disadvantage is, however, that the dissipation during "play" is considerably increased.

Obviously the invention is not limited to the embodiments shown in the Figures, but a large variety of switching devices, both mechanical and electronic, and voltage-responsive elements may be used to realize the inventive idea. Furthermore the invention may also be used for reel-to-reel operation, although the advantages of the arrangement according to the invention will be most clearly apparent when using cassettes.

What is claimed is:

1. Apparatus for driving a tape-shaped record carrier between first and second tape reels comprising, two direct-current motors which each serve to drive a tape reel, a source of supply voltage having a pair of terminals, circuit means coupling said motors to the supply source for controlling said motors for rapid and simultaneous unwinding of the record carrier from one reel and winding it on to the other reel and vice versa such that the torque produced by the motor of the take-up reel is opposed by the torque produced by the motor of the take-off reel, said circuit means including means connecting one end of each of the two motor windings together and to one of the terminals of said supply source via a common impedance during a fast forward and rewind cycle and the other end of the winding of the take-up motor to the other terminal of the supply source and the other end of the winding of the take-off motor to said other terminal of the supply source via a voltage-dependent element so that the voltage across said voltage-dependent element is equal to the sum of the voltages across the two motor windings, said element having an impedance characteristic which, at least above a given voltage level, decreases with increasing voltage.

2. Apparatus as claimed in claim 1 wherein the voltage-dependent element comprises a Zener diode.

3. Apparatus as claimed in claim 2, further comprising a second Zener diode connected in series opposition with the first Zener diode, the said circuit means directly connecting the series-opposition combination of Zener diodes to the other ends of the windings of the two motors.

4. Apparatus as claimed in claim 3 wherein the two Zener diodes are connected with their polarities arranged so that the Zener diode coupled to the winding of the take-off motor is connected in the forward direction for the voltage set up across the two motor windings.

5. Apparatus as claimed in claim 4, wherein the junction point of the two Zener diodes is connected via a switch to the one ends of the two motor windings connected to the common impedance, and means for selectively closing the switch to provide a short-circuit path across the winding of the take-off motor via the switch and one Zener diode for rapidly braking the movement of the record carrier.

6. Apparatus as claimed in claim 4 further comprising means connecting the junction point of the two Zener diodes to a point of constant potential via a resistor and a switch which is closed during a play operation.

7. Apparatus as claimed in claim 1 wherein the common impedance comprises a resistor.

8. Apparatus as claimed in claim 7 further comprising a rectifying element, and means connecting said one end of the motor windings to a point of constant potential via said rectifying element so that for a play operation the supply current for the take-up motor winding is supplied from said point of constant potential via the rectifying element and so that during the wind operation the rectifying element is normally cut off and begins conduction only if the voltage across the winding of the take-up motor drops below a given minimium value whereby the rectifying element passes a supply current for the take-up motor winding.

9. A tape drive apparatus comprising, a source of supply voltage having first and second output terminals, first and second motors having first and second windings, respectively, and adapted to drive first and second tape reels, respectively, means connecting a first end of the first winding to a first end of the second winding to form a junction point therebetween, second means connecting the junction point to the first terminal of the supply source via a common impedance means, voltage dependent means, and switching means coupled to the voltage dependent means and to the second ends of the first and second windings and having first and second states, said first state connecting the second end of the first winding to the second terminal of the supply source and the second end of the second winding to the second terminal of the supply source via said voltage dependent means, said second state connecting the second end of the second winding to the second terminal of the supply source and the second end of the first winding to the second terminal of the supply source via said voltage dependent means, whereby the sum of the voltages across said first and second windings is held constant and is applied across said voltage dependent means to maintain the sum of the speeds of the first and second motors constant.

10. Apparatus as claimed in claim 9 wherein said voltage dependent means comprises a zener diode.

11. Apparatus as claimed in claim 9 wherein said voltage dependent means comprises first and second zener diodes connected in series opposition between the second ends of said first and second windings.

12. Apparatus as claimed in claim 11 wherein said common impedance means comprises a resistor.

13. Apparatus as claimed in claim 11 further comprising a switch connected between the junction point of the first and second zener diodes and said junction point between the first and second windings, and means for selectively operating the switch to an open condition during the play and wind operations and to a closed condition to initiate a motor braking operation to stop the movement of the tape.

14. Apparatus as claimed in claim 9 further comprising diode means coupled to the second ends of said first and second windings and to the second terminal of said supply source via said switching means during a stop condition of the tape thereby to provide paths for currents of opposite polarities to flow through said first and second windings to provide opposed motor torques for maintaining tension in the tape.

15. Apparatus as claimed in claim 9 wherein said second connecting means comprises a controlled switch coupled between the junction point and the common impedance means.

16. Apparatus as claimed in claim 15 further comprising a diode connecting said junction point to a point of constant voltage, means for selectively operating the controlled switch into a closed condition during a wind operation and into an open condition during a play operation, said diode being normally conductive during a play operation to supply current to said motor windings and being normally cut-off during a wind operation until the voltage across the winding of the take-up motor drops below a given level whereupon the diode conducts to supply additional current to the take-up motor winding from said point of constant voltage.

17. Apparatus as claimed in claim 16 wherein said voltage dependent means comprises first and second zener diodes connected in series opposition between the second ends of said first and second windings.

18. Apparatus as claimed in claim 17 further comprising diode means coupled to the second ends of the said first and second windings, a second controlled switch, and means including said second controlled switch for coupling said diode means to the second terminal of the supply source, said controlled switch being selectively operated into cut-off during a wind or play operation and into conduction during a stop operation to provide current paths to allow the flow of opposed currents through said first and second windings.

* * * * *